United States Patent [19]

Tanabe et al.

[11] Patent Number: 5,271,996
[45] Date of Patent: Dec. 21, 1993

[54] REINFORCED TRIM BOARD

[75] Inventors: Kazuo Tanabe; Masateru Fukuda, both of Gifu, Japan

[73] Assignee: Ikeda Bussan Co., Ltd., Ayase, Japan

[21] Appl. No.: 936,778

[22] Filed: Aug. 28, 1992

[30] Foreign Application Priority Data

Sep. 13, 1991 [JP] Japan ................................. 3-82251[U]

[51] Int. Cl.⁵ ...................... D04H 1/08; B32B 21/04
[52] U.S. Cl. .................................. 428/225; 428/280; 428/318.4; 428/537.1
[58] Field of Search ..................... 428/225, 280, 318.4, 428/537.1

[56] References Cited

U.S. PATENT DOCUMENTS 4,472,550 9/1984 Reiff et al. .......................... 524/589
4,810,551 3/1989 Chu ..................................... 428/106

Primary Examiner—George F. Lesmes
Assistant Examiner—Chris Raimund
Attorney, Agent, or Firm—Foley & Lardner

[57] ABSTRACT

A reinforced trim board structure includes a base member and a reinforcing member which is stuck on the base member. The reinforcing member consists essentially of bamboo fiber. Therefore, the reinforced trim board structure becomes light in weight and can be molded by deep drawing.

8 Claims, 2 Drawing Sheets

REINFORCED TRIM BOARD

BACKGROUND OF THE INVENTION

1. Field of the Invention

The present invention relates in general to a reinforced trim board, and more particularly to a reinforced trim board used for an interior lining, for example, of a ceiling member, a door member or a rear parcel shelf of a motor vehicle.

2. Description of the Prior Art

Hitherto, various types of trim boards have been proposed as an interior lining of a motor vehicle. As a base member of the trim board, it is usual to use a resin board, a corrugated cardboard sheet, a foamed polyurethane impregnated with a synthetic resin, or a foamed polystyrene. Some of the trim boards are reinforced with glass fiber. In fact, a layer or two layers of glass fiber are attached to one or two major surfaces of the base member respectively so as to reinforce the trim board. However, the above-mentioned conventional reinforced trim board has the following drawbacks.

When glass fiber is handled, it tends to be broken into splinters and to scatter in a working place. This makes the working environment inferior or hazardous. Furthermore, a trim board tends to become too heavy in weight because of a large specific gravity of glass fiber. Furthermore, it is difficult to mold the trim board by deep drawing because glass fiber itself is brittle.

SUMMARY OF THE INVENTION

It is therefore an object of the present invention to provide a reinforced trim board which is light in weight.

It is another object of the present invention to provide a reinforced trim board which can be molded by deep drawing.

It is still another object of the present invention to provide a reinforced trim board of which reinforcing material does not induce a hazardous problem.

According to the present invention, there is provided a reinforced trim board structure including: a base member; and a reinforcing member stuck on the base member, the reinforcing member consisting essentially of a bamboo fiber.

DETAILED DESCRIPTION OF THE INVENTION

According to the present invention, there is provided a reinforced trim board structure comprising a base member and a reinforcing member stuck on the base member.

As the base member, it is usual to use a resin board, a corrugated cardboard sheet, a foamed polyurethane impregnated with a synthetic resin, or a foamed polystyrene. The synthetic resin may be replaced by a prepolymer, oligomer, a monomer, or the like.

The reinforcing member consists essentially of bamboo fiber. In fact, the reinforcing member according to the present invention is a felt which is made by sticking a needle into and out bamboo fiber, a woven bamboo-fiber fabric, a nonwoven fabric of bamboo fiber which is bound with a synthetic-resin binder, a layer which has bamboo fiber dispersed therein, or the like.

Bamboo fiber has a pipelike structure, a low specific gravity, and a high rigidity. Thus, bamboo fiber has a superior reinforcing characteristic. Furthermore, bamboo fiber has a high flexibility. Therefore, bamboo fiber does not tend to be broken into splinters, and it can be molded by deep drawing.

A layer of the reinforcing member is stuck on one major surface of the base member of the trim board structure by means of a certain adhesive. However, if desired, two layers of the reinforcing member may be stuck on two opposed major surfaces of the base member. As the adhesive, it is usual to use a hot-melt adhesive, a vinyl acetate resin adhesive, an acrylic resin adhesive, a urethane resin adhesive, a melamine resin adhesive, a urea resin adhesive, a synthetic rubber adhesive, or the like.

Figure 1:
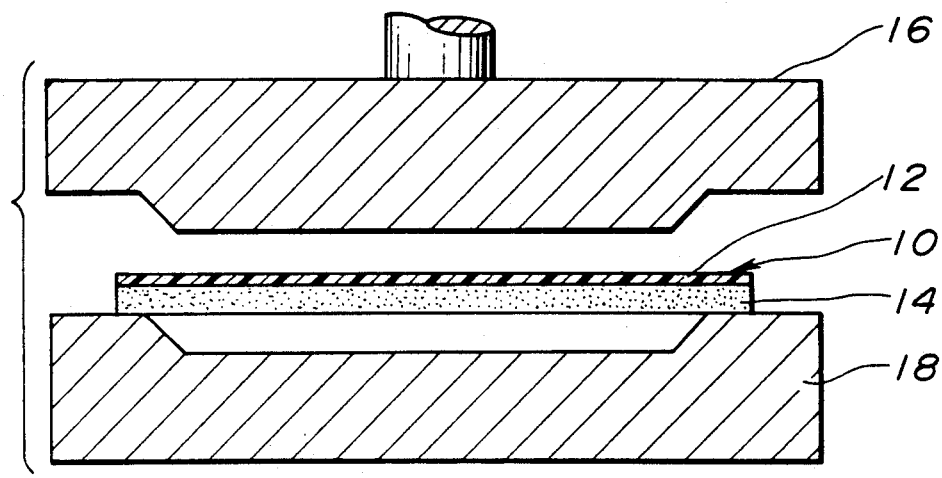
FIG. 1 is a sectional view, showing a first reinforced trim board, and a hot press machine for molding the first reinforced trim board, in accordance with a first embodiment of the present invention.
Figure 2:
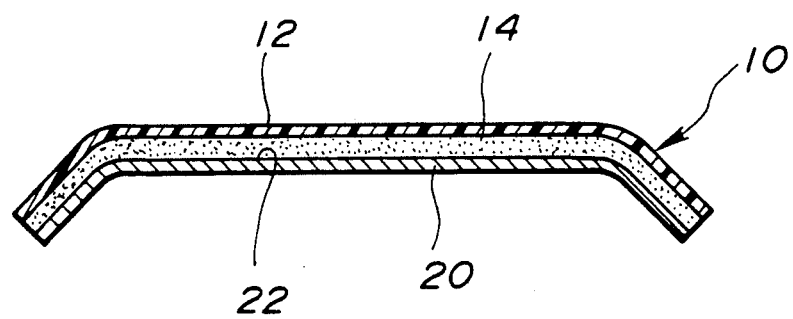
FIG. 2 is a sectional view of a ceiling member which is made of the first reinforced trim board and a first inner trim member, in accordance with the first embodiment.

Referring to FIGS. 1 and 2, a method of preparing a ceiling member of a motor vehicle in accordance with a first embodiment of the present invention will be described in the following.

First, a reinforced trim board 10 is prepared by sticking a nonwoven fabric 12 on a foamed polyurethane 14 which is impregnated with diisocyanate. The nonwoven fabric 12 is made of bamboo fiber which is impregnated with a melamine resin. Then, as is seen from FIG. 1, the trim board 10 is set between upper and lower molds 16 and 18 so as to conduct a hot press at a temperature of 150° C. for 1 min. Then, the molded trim board 10 is taken out, and an inner trim member 20 is stuck on the trim board by means of a hot-melt adhesive 22 so as to provide the ceiling member.

Figure 3:
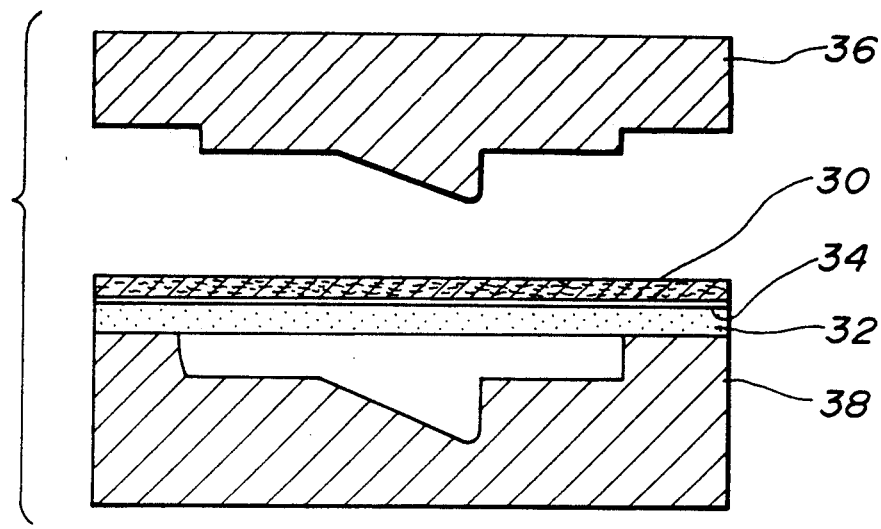
FIG. 3 is a view similar to FIG. 1, but showing a second reinforced trim board and a vacuum molding machine, in accordance with a second embodiment of the present invention.
Figure 4:
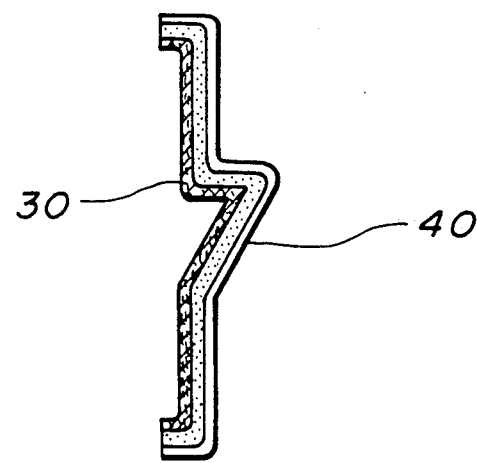
FIG. 4 is a sectional view of a door trim structure which is made of the second reinforced trim board and a second inner trim member, in accordance with the second embodiment.

Referring to FIGS. 3 and 4, a method of preparing a door trim structure of a motor vehicle in accordance with a second embodiment of the present invention will be described in the following.

First, a woven bamboo-fiber fabric 30 is placed on a foamed polystyrene 32 with an interposal of a hot-melt adhesive 34 therebetween so as to construct the trim board. Then, the trim board is heated at a temperature of 150° C. for 1 min, so as to stick the woven bamboo-fiber fabric 30 on the foamed polystyrene 32. Then, as is seen from FIG. 3, the trim board is set between upper and lower molds 36 and 38 so as to conduct a vacuum molding at an ordinary temperature. Then, the molded trim board is taken out, and an inner trim member 40 is stuck on the trim board by means of an acrylic adhesive 42 so as to provide the door trim structure.

The reinforced trim board according to the present invention is light in weight and can be molded by deep drawing because of the use of bamboo fiber. Unlike the conventional glass fiber, bamboo fiber does not tend to be broken into splinters. Therefore, it does not make the working space inferior or hazardous.

What is claimed is:

1. A reinforced trim board structure comprising:
a base member; and
a reinforcing member stuck on said base member, said reinforcing member consisting essentially of a bamboo fiber, said reinforcing member being one selected from the group consisting of a felt which is made by sticking a needle into and out of the bamboo fiber, and a woven fabric of the bamboo fiber.

2. A reinforced trim board structure as claimed in claim 1, wherein said reinforcing member is stuck on said base member by means of an adhesive.

3. A reinforced trim board structure as claimed in claim 2, wherein the adhesive is one selected from the group consisting of a hot-melt adhesive, a vinyl acetate resin adhesive, an acrylic resin adhesive, a urethane resin adhesive, a melamine resin adhesive, a urea resin adhesive, and a synthetic rubber adhesive.

4. A reinforced trim board structure as claimed in claim 3, wherein said base member is one selected from the group consisting of a resin board, a corrugated cardboard sheet, a foamed polyurethane impregnated with a synthetic resin, and a foamed polystyrene.

5. A reinforced trim board structure as claimed in claim 1, wherein said base member is a foamed polyurethane impregnated with diisocyanate.

6. A reinforced trim board structure as claimed in claim 1, wherein said base member is a foamed polystyrene, and wherein said reinforcing member is a woven fabric which is made of the bamboo fiber.

7. A reinforced trim board structure comprising:
a base member; and
a reinforcing member which is stuck on said base member and which is a felt material formed by sticking a needle into and out of a bamboo fiber.

8. A reinforced trim board structure comprising:
a base member; and
a reinforcing member which is stuck on said base member and which is a felt material of bamboo fiber.

* * * * *